E. GURNEY.
BRICKMAKING MACHINE.
APPLICATION FILED DEC. 27, 1912.
1,131,506.
Patented Mar. 9, 1915.
2 SHEETS—SHEET 1.
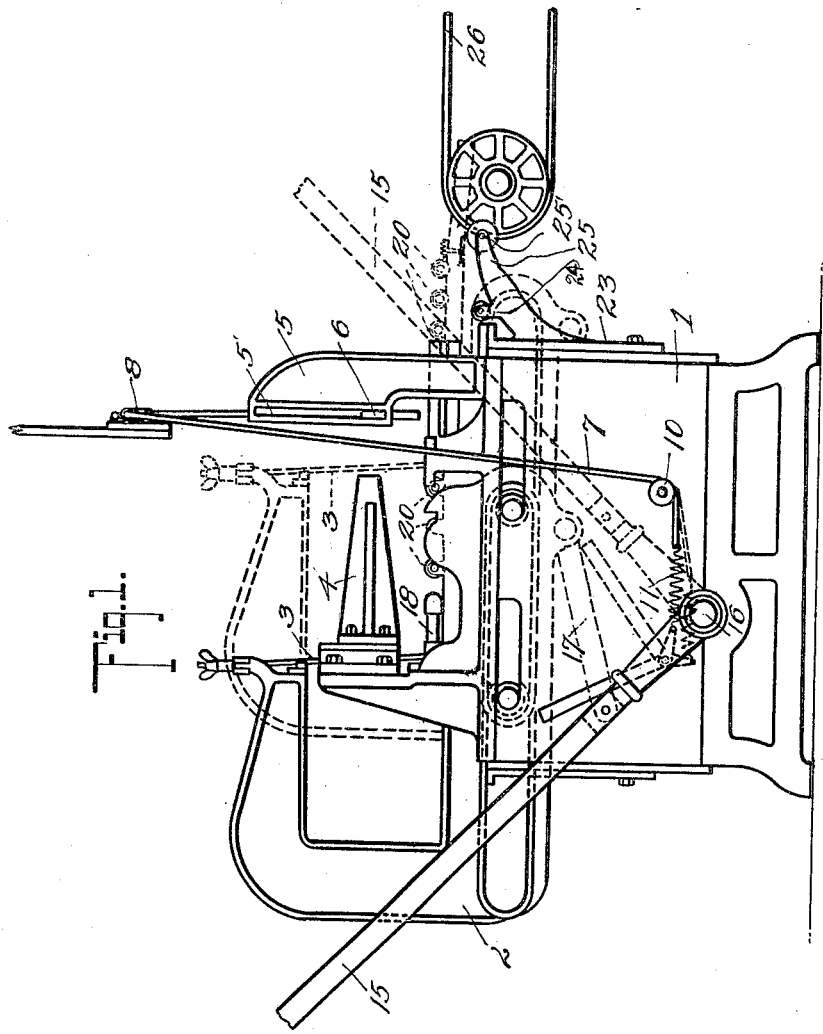
WITNESSES
INVENTOR
Edmund Gurney
BY
ATTORNEY

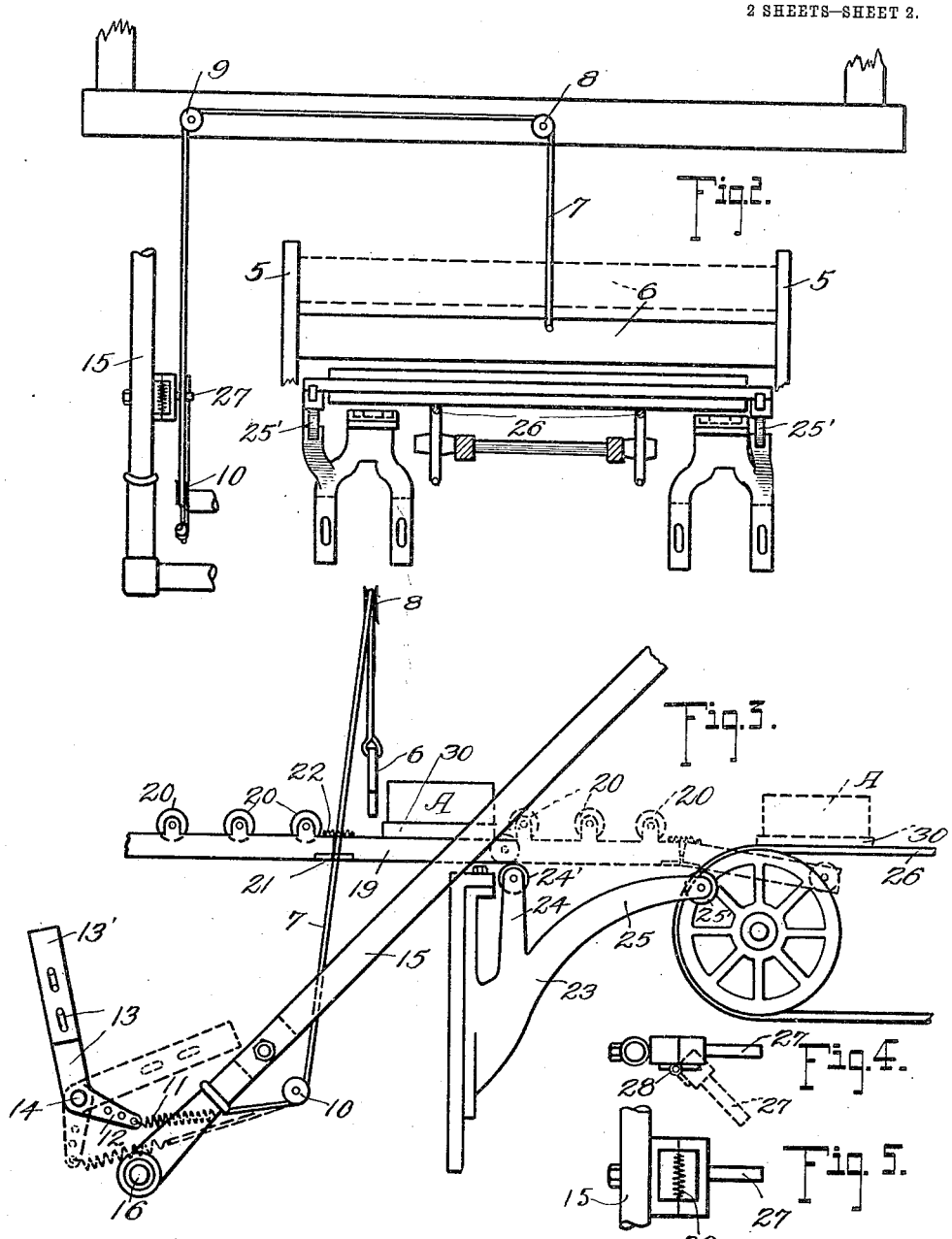

UNITED STATES PATENT OFFICE.

EDMUND GURNEY, OF PORTLAND, OREGON, ASSIGNOR TO P. J. BURNS, OF PORTLAND, OREGON.

BRICKMAKING-MACHINE.

1,131,506.  Specification of Letters Patent.  Patented Mar. 9, 1915.

Application filed December 27, 1912. Serial No. 738,913.

*To all whom it may concern:*

Be it known that I, EDMUND GURNEY, a citizen of the United States, residing at Portland, in the county of Multnomah and State of Oregon, have invented certain new and useful Improvements in Brickmaking Machines, of which the following is a specification.

This invention appertains to the art of brick making, and involves certain improvements in mechanism designed to be used in connection with cutting tables of brick making machines, whereby the operation of transferring the cut bricks from the table to a suitable conveyer is facilitated.

The brick making machine to which the invention is particularly adapted, embodies a suitable table on to which the stick of clay is fed, a carriage which is adapted to reciprocate on the table, and provided with cutting wires which pass through the stick of clay separating the latter into bricks, a pallet adapted to receive the cut bricks thereon and to be moved by the carriage to carry the bricks bodily toward the conveyer, and a stop which is instrumental in shifting the bricks from said pallet upon a second portable pallet which is directly engaged and carried off by the conveyer when loaded.

My invention is directed essentially to the means which controls the operation of the stop above mentioned, and which means is governed in its connection by the main operating lever of the chain, by which lever the carriage aforesaid is reciprocated.

A complete understanding of the invention, and the advantages of the same in operation, will be obtained upon reference to the specific description found hereinafter and to the accompanying drawings, in which—

Figure 1 is a side elevation showing a machine having my improvements applied thereto. Fig. 2 is a fragmentary view bringing out more clearly the mechanism which controls the action of the vertically movable stop. Fig. 3 is a side elevation showing primarily the parts illustrated in Fig. 2, dotted lines indicating the manner in which the delivery arms drop in the action of delivering the bricks to the conveyer. Fig. 4 is a view of the operating lever, the pivoted tripping arm mounted thereon, and dotted lines showing extent of movement of said arm. Fig. 5 is a detail view showing the parts illustrated in Fig. 4 in elevation, the lever being broken away.

Throughout the following detail description and on the several figures of the drawings, similar parts are referred to by like reference characters.

Certain parts of the brick machine or cutting table illustrated in the drawings are conventional, said parts including primarily the stand or frame 1, on the upper portion of which is mounted the reciprocatory carriage 2, the latter, as before premised, being supplied with cutting wires 3, which cut the clay fed to the table into a plurality of bricks. On the stand 1, at one side of the carriage 2 is the stop member 4 with which the free end of the stick of clay fed to the machine engages, preliminary to the cutting off operation. Near the delivery end of the machine are mounted the vertical standards 5, provided for the special purposes of this invention, said standards having the slotted guide-ways 5′, in which is mounted the vertically movable delivery stop 6 shown clearly in Figs. 1, 2 and 3. The stop 6 has an operating cable or flexible connection 7 attached thereto at its central portion and extending over pulleys 8, 9 and 10. A spring, or resilient connection 11 connects cable 7 with the lower arm 12 of an actuating lever 13, which is pivotally mounted upon the stand or frame 1 of the machine, as shown at 14, and adjacent to the main operating lever 15. The resilient connection 11 may be adjusted in regard to its point of connection with the arm 12 by reason of the provision of a plurality of openings longitudinally of said arm.

The main operating lever 15 is that used ordinarily in machines of the class illustrated, being mounted upon a shaft 16 which has suitable arms connected by links 17 with the carriage 2, whereby the latter will be reciprocated when the lever 15 is moved back and forth manually.

The carriage 2 supports a pallet 18, which may be a spreading pallet such as shown in my application for patent, Serial No. 671,439, filed January 16th, 1912, or any other type of pallet. Delivery arms 19 are mounted on the carriage 2 and intermediate said arms and the pallet 18 are a plurality of rollers 20. The delivery arms 19 are pivotally or hingedly connected at 21 with the carriage 2, and there are also provided spring connections 22 between the parts 19 and the carriage. Brackets 23 having the arms 24 and 25 are secured to the stand 1, and said arms carry rollers 24' and 25', respectively. A conveyer 26 of the usual belt type is located at the delivery end of the machine as is shown clearly in Fig. 2.

The main lever 15 is provided upon its inner side with a tripping arm 27 pivoted at 28 and normally held in the full line position shown in Fig. 4, by means of a spring 29 coiled about its axis. The tripping arm 27 is designed to coöperate with the actuating lever 13 in a manner which will now be described.

Operation of machine: Assuming that the parts are in the positions shown in full lines in Fig. 1, and that a stick of clay has already been fed to the machine, and has been cut into bricks by movement of the cutting wires 3 to the left, when the operating lever 15 is moved to the right, the tripping arm 27 engages the actuating lever 13 and tilts the latter to the right, causing a tension to be placed on the connection or cable 7 thereby raising the stop 6. This same movement of the lever 15 of course reciprocates the carriage 2 toward the delivery end of the machine carrying the pallet 18 and cut bricks thereon in the same direction, said bricks passing beneath the now upraised stop 6. As the lever 15 approaches the limit of its said movement to the right, and just after the bricks have been carried beyond the stop 6, the tripping arm 27 which is maintained rigid while moving in the direction stated, passes over the upper extremity of the actuating lever 13, releasing the latter, and permitting the stop 6 to fall or drop in rear of the bricks in the manner shown in Fig. 3 wherein the bricks are designated "A." The lever 15 will now be shifted in an opposite direction, or to the left to cut a fresh portion of the stick of clay into bricks, and the simultaneous movement of the carriage 2 leftward, causes the bricks "A" to be engaged by the stop 6, and shifted over the rollers 20 on to the portable pallet clearly illustrated in Fig. 3, and which pallet is supported by the delivery arms 19. On the next stroke of the lever 15 to the right to bring freshly cut bricks toward the delivery end of the machine, the bricks "A" on the pallet 30 in the position shown in Fig. 3, will be carried outwardly toward the conveyer 26 by the delivery arms 19 which move with the carriage 2, as before described. When the arms 19 reach the dotted line position shown in Fig. 3, they depress slightly under the weight of the bricks, and the pallet 30 and bricks "A" thereon become deposited upon the conveyer 26 so as to be carried off by the latter to a suitable point of deposit or delivery. It may be noted that when the lever 15 moves to the left, the tripping arm 27 yields as it strikes and passes beyond the actuating lever 13, so as not to change the position of the latter lever.

From the foregoing, it will be observed that the movement of the stop 6 is controlled entirely by the lever 15, said stop being raised momentarily as the lever 15 moves to the right, and being dropped when said lever approaches the terminus of such movement. Stop 6 remains in its lower position during the return of leftward movement of the lever 15, and is not raised again until a subsequent movement of the lever 15 to the right. Actuating lever 13 has an adjustable section 13' at its upper end, the adjustment of which permits of taking up wear on the lever 13 incidental to the engagement of the arm 27 therewith.

Having thus described the invention, what is claimed as new is:

1. In a machine of the class described, the combination of a carriage having brick supporting means thereon, means for actuating said carriage to impart delivery movement thereto, a stop adapted to engage bricks supported by the carriage to prevent movement of said bricks with the carriage, means adapted to receive the bricks thereon through the action of the stop on said bricks, and mechanism for controlling said stop.

2. In a machine of the class described, the combination of a carriage adapted to support bricks thereon, means to receive the bricks from the carriage, and mechanism for controlling the delivery of the bricks from the carriage to the last mentioned means, including a stop operable so as not to engage the bricks when the carriage moves in one direction, but to engage said bricks when the carriage moves in the other direction.

3. In a machine of the class described, the combination of a carriage adapted to support bricks thereon, means to receive the bricks from the carriage, and mechanism for controlling the delivery of the bricks from the carriage to the last mentioned means, including a stop operable so as not to engage the bricks when the carriage moves in one direction, but to engage said bricks when the carriage moves in the other direction, and means for operating the carriage adapted to control the operation of said stop.

4. In a machine of the class described, the combination of a carriage adapted to support bricks thereon, means to receive the bricks from the carriage, and mechanism for controlling the delivery of the bricks from the carriage to the last mentioned means, including a stop operable so as not to engage the bricks when the carriage moves in one direction, but to engage said bricks when the carriage moves in the other direction, a lever for reciprocating the carriage back and forth, and means intermediate the lever and said stop to control the operation of the latter.

5. In a machine of the class described, the combination of a carriage adapted to support bricks thereon, means to receive the bricks from the carriage, and mechanism for controlling the delivery of the bricks from the carriage to the last mentioned means, including a stop operable so as not to engage the bricks when the carriage moves in one direction, but to engage said bricks when the carriage moves in the other direction, an operating device for actuating the carriage, an actuating lever connected with the stop, and a member supported by the operating device and operative to impart movement to the actuating lever when the operating device is moved in one direction.

6. In a machine of the class described, the combination of a carriage adapted to support bricks thereon, means to receive the bricks from the carriage, and mechanism for controlling the delivery of the bricks from the carriage to the last mentioned means, including a stop operable so as not to engage the bricks when the carriage moves in one direction, but to engage said bricks when the carriage moves in the other direction, an operating lever for reciprocating the carriage, an actuating lever connected with the stop aforesaid, and means intermediate the operating lever and the actuating lever whereby the latter will be operated when the operating lever is moved in one direction, and will not be operated when the operating lever is moved in the opposite direction.

7. In a machine of the class described, the combination of a carriage adapted to support bricks thereon, means to receive the bricks from the carriage, and mechanism for controlling the delivery of the bricks from the carriage to the last mentioned means, including a stop operable so as not to engage the bricks when the carriage moves in one direction, but to engage said bricks when the carriage moves in the other direction, an operating lever for reciprocating the carriage, an actuating lever connected with the stop, and a member carried by the operating lever and constructed so as to operate the actuating lever at a predetermined time during the movement of the operating lever.

8. In a machine of the class described, the combination of a brick supporting and delivering carriage, a lever for moving said carriage back and forth, a stop adapted to engage bricks on said carriage to effect delivery of the latter, an actuating lever, a flexible connection between the actuating lever and the stop, and a tripping arm carried by the operating lever, said tripping arm being resiliently mounted so as to yield in one direction to pass the actuating lever during a certain portion of the movement of the operating lever.

9. In a machine of the class described, the combination of a carriage adapted to support bricks thereon, means to receive the bricks from the carriage, and mechanism for controlling the delivery of the bricks from the carriage to the last mentioned means, including a stop operable so as not to engage the bricks when the carriage moves in one direction, but to engage said bricks when the carriage moves in the other direction, an operating lever for reciprocating the carriage, an actuating lever connected with the stop, and a member carried by the operating lever and constructed so as to operate the actuating lever at a predetermined time during movement of the operating lever, the actuating lever comprising an adjustable part whose adjustment controls the time of movement of the stop.

10. In a machine of the class described, the combination of a carriage, a portable pallet, means for operating the carriage, means to engage the bricks during operation of the carriage to transfer the latter from the carriage to the portable pallet, and means operable by the carriage operating means for actuating the brick engaging means aforesaid.

11. In a machine of the class described, the combination of a brick delivery carriage, means for actuating said carriage, a portable pallet, a stop to engage bricks during the movement of the carriage to transfer said bricks to the portable pallet, and means for operating the stop controlled by the means for actuating the carriage.

12. In a brick handling machine, a reciprocating mechanism, a pallet carried by the reciprocating mechanism, means to alternately expand and contract the pallet, a removable pallet positioned to receive a load from the expansible pallet, a stripper board positioned to strip a load from the expansible pallet, and means to raise and permit the stripper board to drop in timed relation with the reciprocation of the pallet.

13. In a brick handling machine, a frame, a reciprocating pallet mounted thereon, uprights mounted adjacent the pallet, a stripper board mounted to reciprocate vertically in the upright, a lever for reciprocating the pallet and operative connections between the lever and the stripper board whereby the latter is caused to reciprocate in timed relation with the pallet.

In testimony whereof I affix my signature in presence of two witnesses.

EDMUND GURNEY.

Witnesses:
MARY PAYNE,
EDNA KAYSER.

Copies of this patent may be obtained for five cents each, by addressing the "Commissioner of Patents, Washington, D. C."